(12) United States Patent
Liu et al.

(10) Patent No.: US 10,990,087 B2
(45) Date of Patent: Apr. 27, 2021

(54) PARALLEL CONTROL METHOD AND SYSTEM FOR INTELLIGENT WORKSHOP

(71) Applicant: GUANGDONG UNIVERSITY OF TECHNOLOGY, Guangdong (CN)

(72) Inventors: Qiang Liu, Guangdong (CN); Hao Zhang, Guangdong (CN); Xin Chen, Guangdong (CN); Kuanyuan Li, Guangdong (CN); Jiewu Leng, Guangdong (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 16/819,178

(22) Filed: Mar. 16, 2020

(65) Prior Publication Data
US 2020/0218243 A1 Jul. 9, 2020

Related U.S. Application Data

(63) Continuation of application No. PCT/CN2018/109860, filed on Oct. 11, 2018.

(30) Foreign Application Priority Data

Oct. 17, 2017 (CN) .......................... 201710960936.2

(51) Int. Cl.
*G05B 19/41* (2006.01)
*G05B 19/418* (2006.01)
(Continued)

(52) U.S. Cl.
CPC ... *G05B 19/41885* (2013.01); *G06F 13/4027* (2013.01); *G05B 2219/14015* (2013.01); *G05B 2219/40311* (2013.01)

(58) Field of Classification Search
CPC ... G06F 30/20; G05B 17/02; G05B 19/41885; G05B 13/042; G05B 19/4069;
(Continued)

(56) References Cited

U.S. PATENT DOCUMENTS

| 5,179,527 | A * | 1/1993 | Lawrenz | G05B 13/042 700/29 |
| 9,423,781 | B2 * | 8/2016 | Morgan | G05B 17/02 |

(Continued)

FOREIGN PATENT DOCUMENTS

| CN | 101976067 A | 2/2011 |
| CN | 105260547 A | 1/2016 |

(Continued)

*Primary Examiner* — Michael J Brown

(57) ABSTRACT

A parallel control method for an intelligent workshop is provided, comprising the following steps: step A: constructing a parallel control simulation platform; step B: establishing a parallel execution mechanism; and, step C: correcting and optimizing a parallel control system. A parallel control system for an intelligent workshop is provided, comprising: an MES module configured to issue production instructions to unit management modules; the unit management modules configured to convert the received production instructions into machine instructions and synchronously issue the machine instructions to underlying PLCs by a bus control network module, and drive the parallel control simulation platform and a field device to move by a soft PLC and a hard PLC; the bus control network module configured to establish a communication network among the MES module, an SCADA module, an industrial personal computer, physical devices and a whole-line simulation model; and, the SCADA module.

5 Claims, 3 Drawing Sheets

(51) Int. Cl.
*G06F 13/40* (2006.01)
*C08L 75/02* (2006.01)
*C08L 57/00* (2006.01)
*C08K 5/56* (2006.01)
*C08K 3/36* (2006.01)

(58) Field of Classification Search
CPC .......... G05B 2219/23456; G05B 2219/34477; G05B 13/04; G05B 13/041; G05B 2219/14015; G05B 2219/37591; G05B 2219/40311; C08L 75/02; C08L 57/00; C08L 2312/08; C07F 7/0836; C08K 5/56; C08K 3/36; C08K 5/5419; C08K 7/22; C08K 5/0091
USPC ......................................................... 700/96
See application file for complete search history.

(56) References Cited

U.S. PATENT DOCUMENTS

| | | | |
|---|---|---|---|
| 2014/0278323 A1 | 9/2014 | Wright | |
| 2016/0110662 A1* | 4/2016 | Dispoto | G06Q 10/06 705/7.27 |
| 2019/0377334 A1* | 12/2019 | Nakamura | G05B 19/41885 |

FOREIGN PATENT DOCUMENTS

| | | |
|---|---|---|
| CN | 106056298 A | 10/2016 |
| CN | 106157377 A | 11/2016 |
| CN | 106774223 A | 5/2017 |
| CN | 107861478 A | 3/2018 |

\* cited by examiner

PARALLEL CONTROL METHOD AND SYSTEM FOR INTELLIGENT WORKSHOP

CROSS-REFERENCE TO RELATED APPLICATIONS

This application is a continuation of International Patent Application No. PCT/CN2018/109860, filed on Oct. 11, 2018, which claims the benefit of priority from Chinese Patent Application No. 201710960936.2, filed on Oct. 17, 2017. The contents of the aforementioned application, including any intervening amendments thereto, are incorporated herein by reference in its entirety.

TECHNICAL FIELD

The present invention relates to the technical field of industrial automation, and in particular to a parallel control method and system for an intelligent workshop.

BACKGROUND OF THE PRESENT INVENTION

With the increasing personalized demands in the consumer market, the organization of production workshops in the discrete manufacturing industry demonstrates a new feature: frequently replacement of production products or models in the workshop. Flexibility has become an inherent technical requirement of an intelligent workshop. Customized production industries such as dies, customized devices and personalized furniture show a typical production feature: multi-specification and small-scale. The production devices must have enough processing flexibility. By technical means such as flexible fixture and processing code parameterization, a series of products with certain difference in specification can be processed. In this way, it is convenient for batch production of products with similar specifications. The feature of high-frequency product change also exists in the 3C industry. In addition to the flexible operation capability of manufacturing resources (manpower), workshop production organization and scheduling also require high flexibility. According to the structural features of products in orders and the corresponding processing or assembly task distribution, the manufacturing resources and operation tasks are dynamically allocated to improve the production balance rate and maximize the production capacity.

The inherent requirement of "double flexibility", the new feature of "high-frequency product change" and the urgent demand for "synchronous optimization" bring a new challenge to the operation of the intelligent workshop. It is required to realize synchronous control on three-dimensional visualization and real-time performance of the intelligent workshop, so as to realize the real-time response and diagnosis of workshop abnormalities and the real-time monitoring and management of workshop operation performances. However, these requirements cannot be satisfied by the existing technologies.

SUMMARY OF THE PRESENT INVENTION

Based on the digital twin technology, the present invention provides a parallel control method and system for an intelligent workshop, in order to realize prediction, real-time monitoring and quick response to random events such as emergent order launch, quality accident and device failure in an intelligent workshop, and to realize, by a three-dimensional visual parallel control platform, the real-time acquisition and multi-view display of data of a workshop device control system and sensors, the real-time monitoring and three-dimensional visual display of the workshop operation state and the real-time management of workshop performance.

For this purpose, the present invention employs the following technical solutions.

A parallel control method for an intelligent workshop is provided, including the following steps:

step A: constructing a parallel control simulation platform: performing accurate digital modeling on a real workshop site by third-party simulation software, performing secondary development, performing motion planning of the model and corresponding action control scripts, constructing a downlink instruction channel and an uplink information channel, establishing, by means of an industrial control network, a communication mechanism for a soft PLC and a hard PLC and an asynchronous periodicity synchronization guarantee mechanism for the soft PLC and the hard PLC to realize communication and integration with an upper-level MES module and a lower-level control network, and constructing a parallel control simulation platform equivalent to a workshop site;

step B: establishing a parallel execution mechanism: based on the digital twin technology, establishing a parallel execution mechanism for action synchronization of a workshop device model and physical objects thereof;

realizing a communication channel among a soft PLC of a workshop digital model, a PLC of a physical workshop device and configuration software to realize interconnection and intercommunication of data and information, so that a stand-alone physical device can realize action synchronization with a stand-alone digital model corresponding to the whole line on the parallel control simulation platform; and step C: correcting and optimizing the parallel control system: by the parallel control system, performing simulated launch and simulated production of orders, performing full-view and cross-granularity monitoring of a workshop operation process, performing management of various production operation indexes and response processing of emergencies during an execution process, and performing performance analysis and execution optimization of devices.

Further, the step A further includes:

static modeling of the workshop: by a three-dimensional digital modeling tool and in combination with physical workshop devices and layout thereof, performing three-dimensional modeling of workshop devices, modeling moving components and non-moving components respectively, and performing whole-line virtual assembly on simulation software; and whole-line action modeling: under the premise of completing the whole-line virtual assembly, and in combination with the action of workshop devices and the workshop logistics, performing action planning of special devices and intermediate devices, performing logistics and motion planning of articles being processed, and compiling motion and action control scripts to realize an offline simulation operation of the workshop.

Further, the step B further includes:

establishment of a synchronous data communication channel: establishing, by an industrial Ethernet, a communication network among the MES module, the SCADA module, the industrial personal computer, the physical devices and the whole-line simulation model, and determining a communication protocol standard, an instruction format standard and a field information format by a field bus communication network using a digital, two-way transmission and multi-branch structure, and establishing a data synchronization channel in the parallel control system to realize interconnection and intercommunication of data and information in each link; and internal feedback of the parallel control system: on the basis of completing the construction of the parallel control simulation platform and the establishment of the synchronous data communication, establishing an internal feedback mechanism of the parallel control system of the workshop;

on one hand, production instructions are issued to unit management modules by the MES module, and the unit management modules convert the production instructions into machine instructions upon receiving the production instructions, then issue the machine instructions to PLCs of physical workshop devices by the bus control network module and drive the parallel control simulation platform and a field device to move by soft and hard PLCs; and on the other hand, field information and motion states of the field device and the parallel control simulation platform are uploaded to the SCADA module in the form of real-time data acquired by sensors by the bus control network module, and the state and data of each link is fed back to the MES module to form a closed-loop network.

Further, the step C further includes:

simulated production of the parallel control system: launching a large number of real orders in the parallel control system, designing various tests for the system, introducing various uncertain factors and events, analyzing, by a statistical method, the output of simulated production of the parallel control simulation platform and storing the output in a knowledge base, by which various random events possibly occurring during real production can be verified; and interactive operation of the parallel control simulation platform and a field workshop control system: connecting, based on the digital twin technology, a workshop site to the parallel control simulation platform, performing real-time dynamic comparison and analysis on production behaviors of the two control systems by an MES module in a workshop management center, studying the reference and prediction of respective future conditions, and correspondingly adjusting the control and management mode of the two control systems; and, according to the structural features of products in the orders and the corresponding processing or assembly task distribution, dynamically allocating manufacturing resources and operation tasks to improve the production balance rate and maximize the production capacity.

A parallel control system for an intelligent workshop is provided, including:

an MES module configured to issue production instructions to unit management modules;

the unit management modules configured to convert the received production instructions into machine instructions, issue the machine instructions to PLCs of physical workshop devices by a bus control network module, and drive the parallel control simulation platform and a field device to move by a soft PLC and a hard PLC;

the bus control network module configured to establish a communication network among the MES module, an SCADA module, an industrial personal computer, physical devices and a whole-line simulation module; and the SCADA module configured to receive field information and motion states of the field device and the parallel control simulation platform and receive real-time data acquired by sensors.

In accordance with the above description and based on the digital twin technology, the present invention provides a parallel control method and system for an intelligent workshop, in order to realize prediction, real-time monitoring and quick response to random events such as emergent order launch, quality accident and device failure in an intelligent workshop, and to realize, by a three-dimensional visual parallel control platform, the real-time acquisition and multi-view display of data of a workshop device control system and sensors, the real-time monitoring and three-dimensional visual display of the workshop operation state and the real-time management of workshop performance.

DETAILED DESCRIPTION OF THE PRESENT INVENTION

Figure 1:
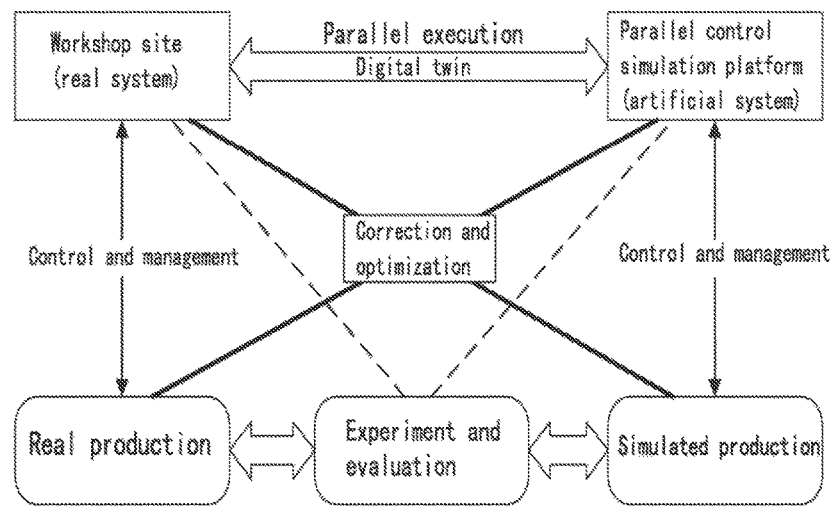
FIG. 1 is a principle diagram of a parallel control system for an intelligent workshop according to an embodiment of the present invention.
Figure 2:
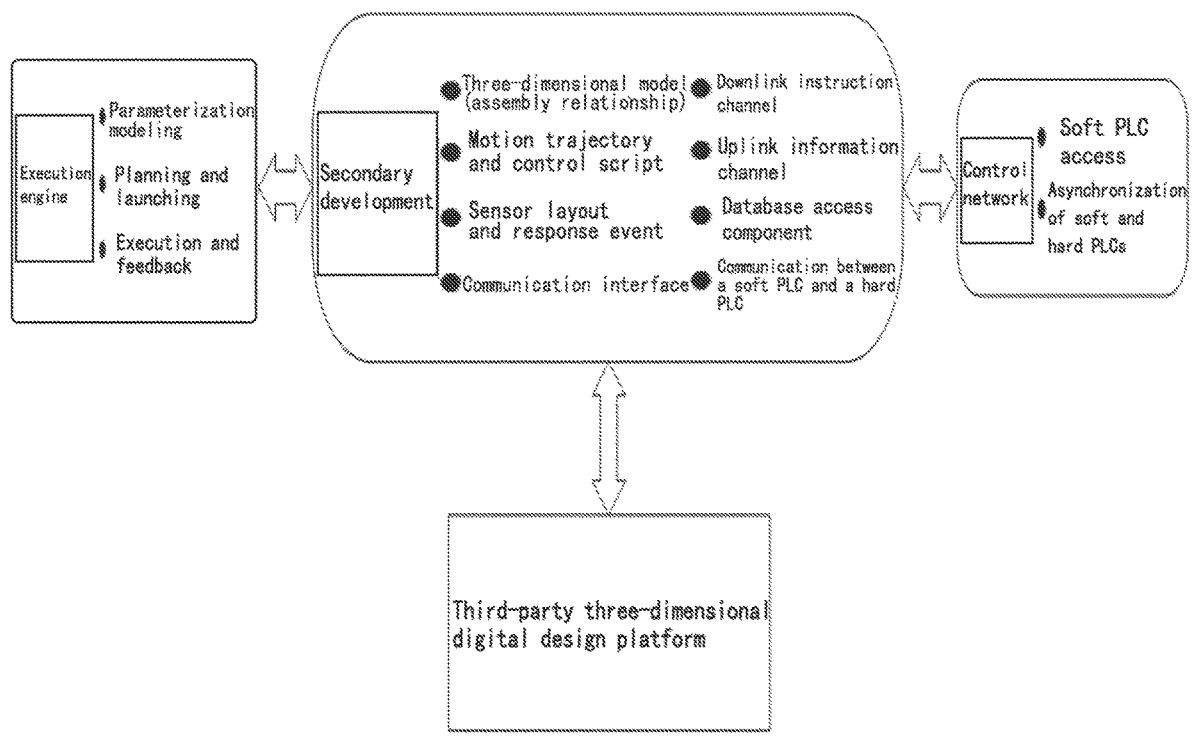
FIG. 2 is a flowchart of designing a parallel control simulation platform according to an embodiment of the present invention.
Figure 3:
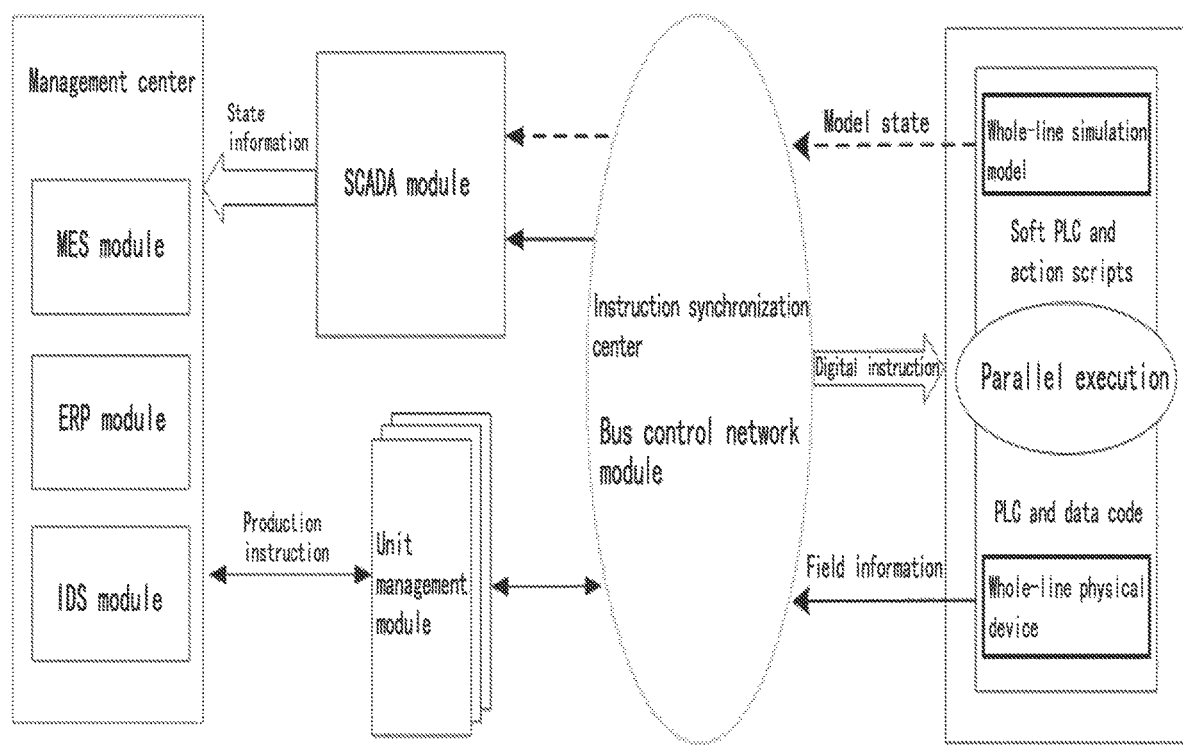
FIG. 3 is an architecture diagram of the parallel control system for an intelligent workshop according to an embodiment of the present invention.
Figure 4:
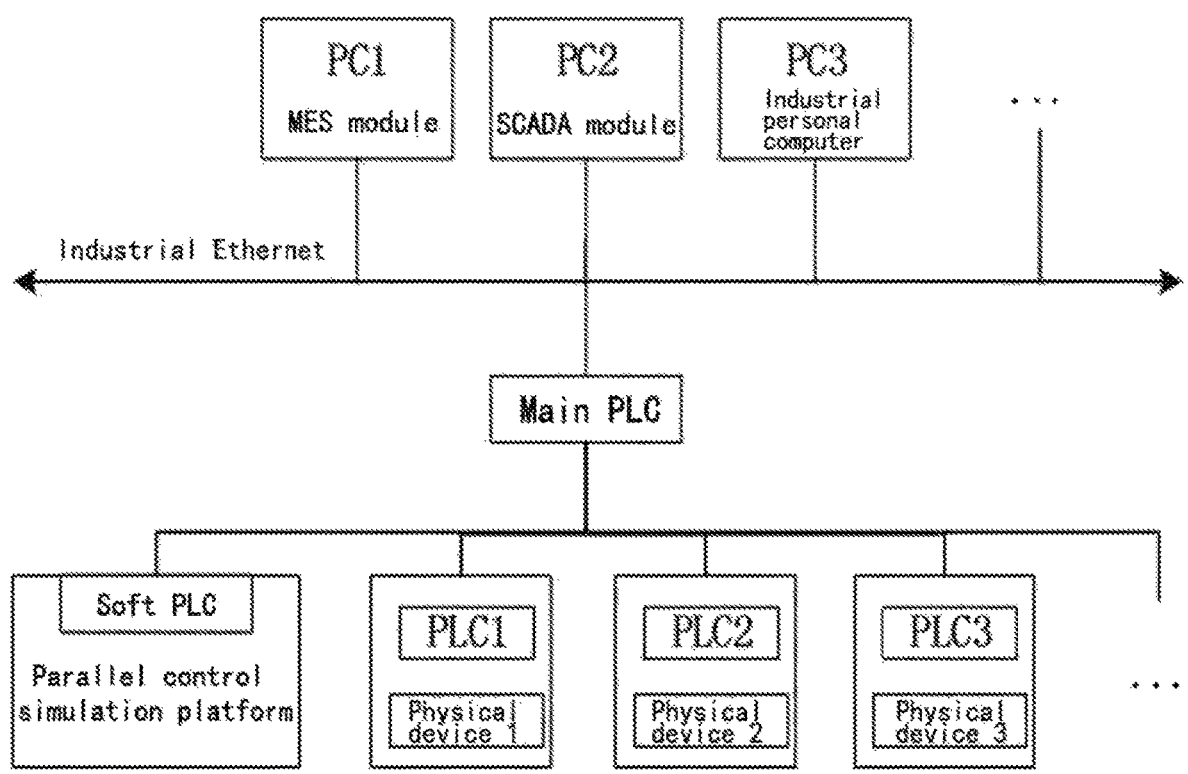
FIG. 4 is a block diagram of a synchronous data communication channel according to an embodiment of the present invention.

The technical solutions of the present invention will be further described below by specific implementations with reference to the accompanying drawings.

The present invention is based on the following prerequisites: there are a design platform cable of performing three-dimensional digitalization and a corresponding three-dimensional visual engine; there is a virtual device capable of supporting stand-alone devices; the action of devices or the motion of articles being processed can be controlled by scripts; and, there is a soft PLC function.

Digital twin is a simulation process of integrating multiple disciplines, multiple physical quantities, multiple dimensions and multiple probabilities by fully utilizing physical models, sensor updates, operation histories and other data. Mapping is performed in a virtual space to reflect the full life cycle of a corresponding physical device. It is also called "digital mirroring", "digital twins" or "digital mapping".

Parallel control means that, based on the conventional small closed-loop control, large closed-loop control is used to form an real part of a parallel control system. Based on this, an artificial system equivalent to the real system is established. Analysis and evaluation are performed by the artificial system through computational experiments, and management and control of a complex system are realized. Thus, a double-closed-loop control system, i.e., a parallel control system, is formed.

A parallel control method for an intelligent workshop is provided, including the following steps.

Step A: Construction of a parallel control simulation platform: accurate digital modeling is performed on a real workshop site by third-party simulation software, secondary development is performed, motion planning of the model and corresponding action control scripts are performed to construct a downlink instruction channel and an uplink information channel, a communication mechanism for a soft PLC and a hard PLC and an asynchronous periodicity synchronization guarantee mechanism for the soft PLC and the hard PLC are established by means of an industrial control network to realize communication and integration with an upper-level MES module and a lower-level control network, and a parallel control simulation platform equivalent to the workshop site is constructed.

Step B: Establishment of a parallel execution mechanism: based on the digital twin technology, a parallel execution mechanism for action synchronization of a workshop device model and physical objects thereof is established.

A communication channel among a soft PLC of a workshop digital model, a PLC of a physical workshop device and configuration software is realized to realize interconnection and intercommunication of data and information, so that a stand-alone physical device can realize action synchronization with a stand-alone digital model corresponding to the whole line on the parallel control simulation platform.

Step C: Correction and optimization of the parallel control system: by the parallel control system, simulated launch and simulated production of orders is performed, full-view and cross-granularity monitoring of a workshop operation process is performed, management of various production operation indexes and response processing of emergencies during an execution process are performed, and performance analysis and execution optimization of devices are performed.

In the present invention, accurate digital modeling is performed on a real system (i.e., a workshop site) by third-party digital simulation software, and an artificial system (i.e., a parallel control simulation platform of the present invention) equivalent to the real system is established.

On the parallel control simulation platform, by receiving the simulated orders launched by the MES module and introducing factors and events that are difficultly quantified in the conventional control, the operation rules and interaction relations among various production factors of the real system (i.e., the workshop site) in normal and abnormal states are obtained by computational experiments or tests.

Based on the digital twin technology, the workshop site and the parallel control simulation platform are connected to each other, production behaviors of the workshop site and the parallel control simulation platform are dynamically compared and analyzed in real time, the reference and evaluation of respective future conditions are studied, and respective control and management modes are adjusted correspondingly.

In the case of production in an abnormal state (i.e., random production events such as emergent order launch, quality accident and device failure), the real workshop production is directed by the equivalent output generated by the parallel control simulation platform; and, in a normal state, the model and algorithm of the parallel control simulation platform are corrected by the real production data of the workshop site, and the real control system of the workshop is continuously optimized by the parallel control simulation platform.

Therefore, although the changing real production workshop cannot be modeled absolutely accurately, rolling optimization on the basis of continuous adaptation can be realized with the aid of the parallel control simulation platform.

In accordance with the present invention, the prediction, real-time monitoring and quick response to random events such as emergent order launch, quality accident and device failure in an intelligent workshop can be realized, and the real-time acquisition and multi-view display of data of a workshop device control system and sensors, the real-time monitoring and three-dimensional visual display of the workshop operation state and the real-time management of workshop performance can be realized by a three-dimensional visual parallel control platform.

Further, the step A further includes:

static modeling of the workshop: by a three-dimensional digital modeling tool and in combination with physical workshop devices and layout thereof, performing three-dimensional modeling of workshop devices, modeling moving components and non-moving components respectively, and performing whole-line virtual assembly on simulation software; and whole-line action modeling: under the premise of completing the whole-line virtual assembly, and in combination with the action of workshop devices and the workshop logistics, performing action planning of special devices and intermediate devices, performing logistics and motion planning of articles being processed, and compiling motion and action control scripts to realize an offline simulation operation of the workshop.

Further, the step B further includes:

establishment of a synchronous data communication channel: establishing, by an industrial Ethernet, a communication network among the MES module, the SCADA module, the industrial personal computer, the physical devices and the whole-line simulation model, and determining a communication protocol standard, an instruction format standard and a field information format by a field bus communication network using a digital, two-way transmission and multi-branch structure, and establishing a data synchronization channel in the parallel control system to realize interconnection and intercommunication of data and information in each link; and internal feedback of the parallel control system: on the basis of completing the construction of the parallel control simulation platform and the establishment of the synchronous data communication, establishing an internal feedback mechanism of the parallel control system of the workshop.

On one hand, production instructions are issued to unit management modules by the MES module, and the unit management modules convert the production instructions into machine instructions upon receiving the production instructions, then issue the machine instructions to PLCs of physical workshop devices by the bus control network module and drive the parallel control simulation platform and a field device to move by soft and hard PLCs.

On the other hand, field information and motion states of the field device and the parallel control simulation platform are uploaded to the SCADA module in the form of real-time data acquired by sensors by the bus control network module, and the state and data of each link is fed back to the MES module to form a closed-loop network.

Further, the step C further includes:

simulated production of the parallel control system: launching a large number of real orders in the parallel control system, designing various tests for the system, introducing various uncertain factors and events, analyzing, by a statistical method, the output of simulated production of the parallel control simulation platform and storing the output in a knowledge base, by which various random events possibly occurring during real production can be verified; and interactive operation of the parallel control simulation platform and a field workshop control system: connecting, based on the digital twin technology, a workshop site to the parallel control simulation platform, performing real-time dynamic comparison and analysis on production behaviors of the two control systems by an MES module in a workshop management center, studying the reference and prediction of respective future conditions, and correspondingly adjusting the control and management mode of the two control systems; and, according to the structural features of products in the orders and the corresponding processing or assembly task distribution, dynamically allocating manufacturing resources and operation tasks to improve the production balance rate and maximize the production capacity A parallel control system for an intelligent workshop is provided, including:

an MES module configured to issue production instructions to unit management modules;

the unit management modules configured to convert the received production instructions into machine instructions, issue the machine instructions to PLCs of physical workshop devices by a bus control network module, and drive the parallel control simulation platform and a field device to move by a soft PLC and a hard PLC;

the bus control network module configured to establish a communication network among the MES module, an SCADA module, an industrial personal computer, physical devices and a whole-line simulation module; and the SCADA module configured to receive field information and motion states of the field device and the parallel control simulation platform and receive real-time data acquired by sensors.

Production instructions are issued to the unit management modules by the MES module, and the unit management modules convert the production instructions into machine instructions upon receiving the production instructions, then issue the machine instructions to PLCs of physical workshop devices by the bus control network module and drive the simulation platform and the field device to move by soft and hard PLCs. On the other hand, field information and motion states of the field device and the simulation platform are uploaded to the SCADA module in the form of real-time data acquired by sensors by the bus control network module, and the state and data of each link is fed back to the MES module to form a closed-loop network.

The technical principle of the present invention has been described above by specific embodiments. The descriptions are merely for explaining the principle of the present invention, and shall not be interpreted as limiting the protection scope of the present invention in any way. Based on the explanations here, those skilled in the art can conceive of other specific implementations of the present invention without paying any creative effort, and these implementations shall fall into the protection scope of the present invention.

What is claimed is:

1. A parallel control method for an intelligent workshop, comprising the following steps:

step A: constructing a parallel control simulation platform: performing accurate digital modeling on a real workshop site by third-party simulation software, performing secondary development, performing motion planning of the model and corresponding action control scripts, constructing a downlink instruction channel and an uplink information channel, establishing, by means of an industrial control network, a communication mechanism for a soft PLC and a hard PLC and an asynchronous periodicity synchronization guarantee mechanism for the soft PLC and the hard PLC to realize communication and integration with an upper-level IVIES module and a lower-level control network, and constructing the parallel control simulation platform equivalent to the workshop site;

step B: establishing a parallel execution mechanism: based on a digital twin technology, establishing the parallel execution mechanism for action synchronization of a workshop device model and physical objects thereof;

realizing a communication channel among a soft PLC of a workshop digital model, a PLC of a physical workshop device and configuration software to realize interconnection and intercommunication of data and information, so that a stand-alone physical device can realize action synchronization with a stand-alone digital model corresponding to the whole line on the parallel control simulation platform; and step C: correcting and optimizing the parallel control system: by the parallel control system, performing simulated launch and simulated production of orders, performing full-view and cross-granularity monitoring of a workshop operation process, performing management of various production operation indexes and response processing of emergencies during an execution process, and performing performance analysis and execution optimization of devices.

2. The parallel control method for an intelligent workshop according to claim 1, wherein the step A further comprises:

static modeling of the workshop: by a three-dimensional digital modeling tool and in combination with physical workshop devices and layout thereof, performing three-dimensional modeling of workshop devices, modeling moving components and non-moving components respectively, and performing whole-line virtual assembly on simulation software; and whole-line action modeling: under the premise of completing the whole-line virtual assembly, and in combination with the action of workshop devices and the workshop logistics, performing action planning of special devices and intermediate devices, performing logistics and motion planning of articles being processed, and compiling motion and action control scripts to realize an offline simulation operation of the workshop.

3. The parallel control method for an intelligent workshop according to claim 2, wherein the step B further comprises:

establishment of a synchronous data communication channel: establishing, by an industrial Ethernet, a communication network among the IVIES module, the SCADA module, the industrial personal computer, the physical devices and the whole-line simulation model, and determining a communication protocol standard, an instruction format standard and a field information format by a field bus communication network using a digital, two-way transmission and multi-branch structure, and establishing a data synchronization channel in the parallel control system to realize interconnection and intercommunication of data and information in each link; and internal feedback of the parallel control system: on the basis of completing the construction of the parallel control simulation platform and the establishment of the synchronous data communication, establishing an internal feedback mechanism of the parallel control system of the workshop;

on one hand, production instructions are issued to unit management modules by the IVIES module, and the unit management modules convert the production instructions into machine instructions upon receiving the production instructions, then issue the machine instructions to PLCs of physical workshop devices by the bus control network module and drive the parallel control simulation platform and a field device to move by soft and hard PLCs; and on the other hand, field information and motion states of the field device and the parallel control simulation platform are uploaded to the SCADA module in the form of real-time data acquired by sensors by the bus control network module, and the state and data of each link is fed back to the IVIES module to form a closed-loop network.

4. The parallel control method for an intelligent workshop according to claim 3, wherein the step C further comprises:

simulated production of the parallel control system: launching a large number of real orders in the parallel control system, designing various tests for the system, introducing various uncertain factors and events, analyzing, by a statistical method, the output of simulated production of the parallel control simulation platform and storing the output in a knowledge base, by which various random events possibly occurring during real production can be verified; and interactive operation of the parallel control simulation platform and a field workshop control system: connecting, based on the digital twin technology, a workshop site to the parallel control simulation platform, performing real-time dynamic comparison and analysis on production behaviors of the two control systems by an IVIES module in a workshop management center, studying the reference and prediction of respective future conditions, and correspondingly adjusting the control and management mode of the two control systems; and, according to the structural features of products in the orders and the corresponding processing or assembly task distribution, dynamically allocating manufacturing resources and operation tasks to improve the production balance rate and maximize the production capacity.

5. A system to which the parallel control method for an intelligent workshop according to claim 4 is applied, comprising:

an IVIES module configured to issue production instructions to unit management modules;

the unit management modules configured to convert the received production instructions into machine instructions, issue the machine instructions to PLCs of physical workshop devices by a bus control network module, and drive the parallel control simulation platform and a field device to move by a soft PLC and a hard PLC;

the bus control network module configured to establish a communication network among the IVIES module, an SCADA module, an industrial personal computer, physical devices and a whole-line simulation module; and the SCADA module configured to receive field information and motion states of the field device and the parallel control simulation platform and receive real-time data acquired by sensors.

* * * * *